United States Patent
Morioka et al.

(10) Patent No.: US 8,819,262 B2
(45) Date of Patent: Aug. 26, 2014

(54) REPRODUCTION APPARATUS AND REPRODUCTION METHOD

(75) Inventors: Yasuhiro Morioka, Kawasaki (JP); Naozumi Koshino, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 610 days.

(21) Appl. No.: 12/796,337

(22) Filed: Jun. 8, 2010

(65) Prior Publication Data

US 2011/0090406 A1 Apr. 21, 2011

(30) Foreign Application Priority Data

Oct. 16, 2009 (JP) ................................ 2009-239507

(51) Int. Cl.
*G06F 15/16* (2006.01)

(52) U.S. Cl.
USPC ............................. 709/231; 348/24; 348/460

(58) Field of Classification Search
CPC ............ H04N 21/4622; H04N 21/812; H04L 65/4076; H04L 65/4084; H04H 20/38; H04H 20/93; H04H 20/78; H04H 40/90
USPC ...................... 709/231; 348/24, 460
See application file for complete search history.

(56) References Cited

U.S. PATENT DOCUMENTS

| | | | | |
|---|---|---|---|---|
| 2007/0176820 A1* | 8/2007 | Vidal | ............................. | 341/176 |
| 2007/0236615 A1* | 10/2007 | Tanaka et al. | ................. | 348/734 |
| 2008/0098432 A1* | 4/2008 | Hardacker et al. | ............... | 725/51 |
| 2008/0309795 A1* | 12/2008 | Mitsuhashi et al. | ..... | 348/231.99 |
| 2009/0320073 A1* | 12/2009 | Reisman | .......................... | 725/51 |
| 2010/0031193 A1* | 2/2010 | Stark et al. | ..................... | 715/810 |
| 2010/0138868 A1* | 6/2010 | Sie et al. | ......................... | 725/46 |

FOREIGN PATENT DOCUMENTS

| | | |
|---|---|---|
| JP | 08-181926 | 7/1996 |
| JP | 2002-101351 | 4/2002 |
| JP | 2003-319275 | 11/2003 |
| JP | 2005-303394 | 10/2005 |
| JP | 2005-121875 | 12/2005 |
| JP | 2006-180137 | 7/2006 |
| JP | 2007-006443 | 1/2007 |
| JP | 2008-011524 | 1/2008 |
| JP | 2008-271334 | 11/2008 |
| JP | 2009-129194 | 6/2009 |

OTHER PUBLICATIONS

Japanese Office Action dated Aug. 10, 2010, filed in Japanese counterpart Application No. 2009-239507, 4 pages (in English).
Japanese Office Action, issued in corresponding Japanese patent application No. 2010-270238 mailed Jan. 22, 2013, 2 pages (with English translation).

* cited by examiner

*Primary Examiner* — Phuoc Nguyen
(74) *Attorney, Agent, or Firm* — Patterson & Sheridan, LLP

(57) ABSTRACT

According to one embodiment, when receiving a reproduction instruction, a reproduction apparatus performs image display based on second image information acquired through a network. When the reproduction apparatus receives a stop instruction while performing the image display based on the second image information, the reproduction apparatus performs the image display based on received first image information after performing the image display for a predetermined time based on third image information.

24 Claims, 7 Drawing Sheets

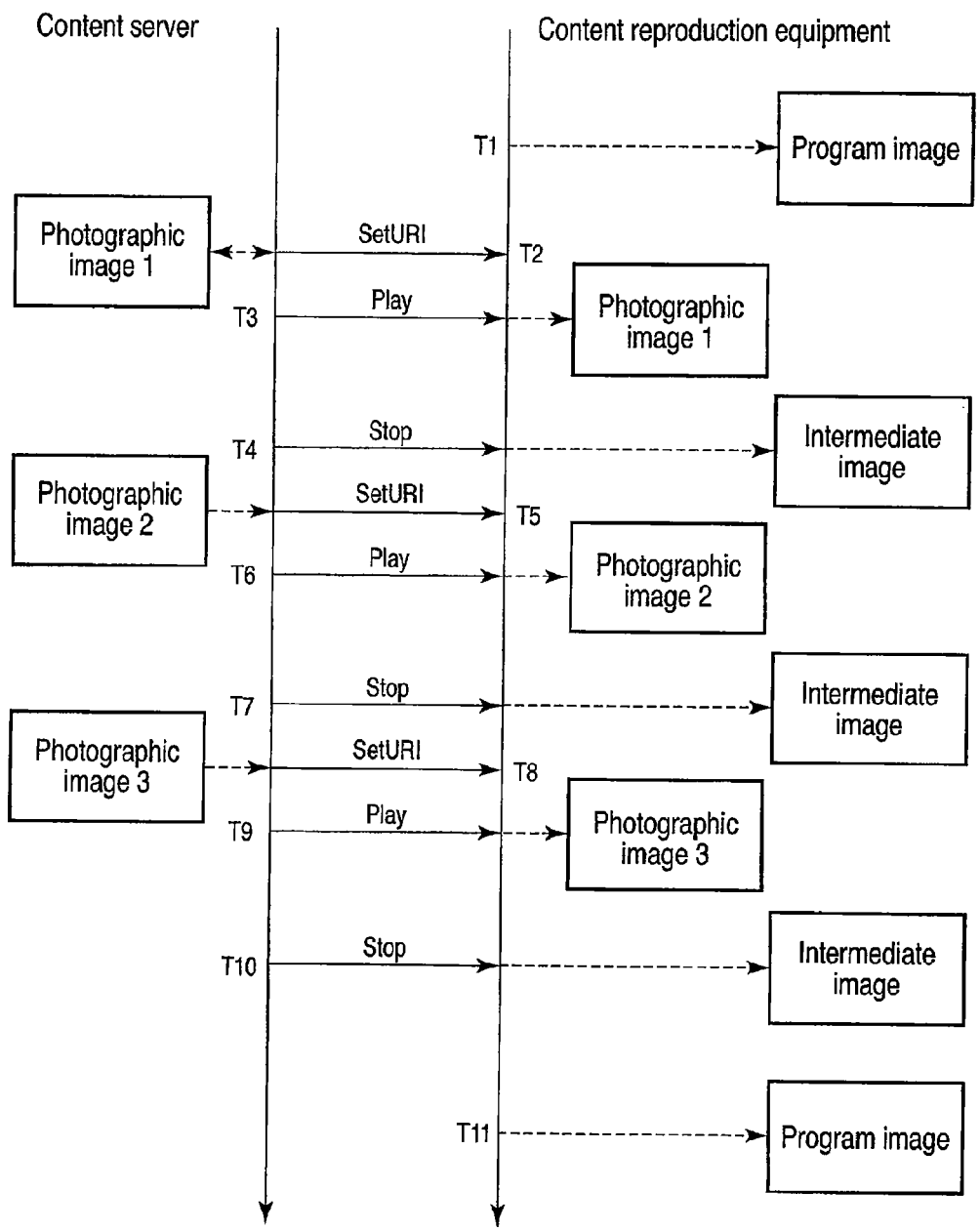
F I G. 3

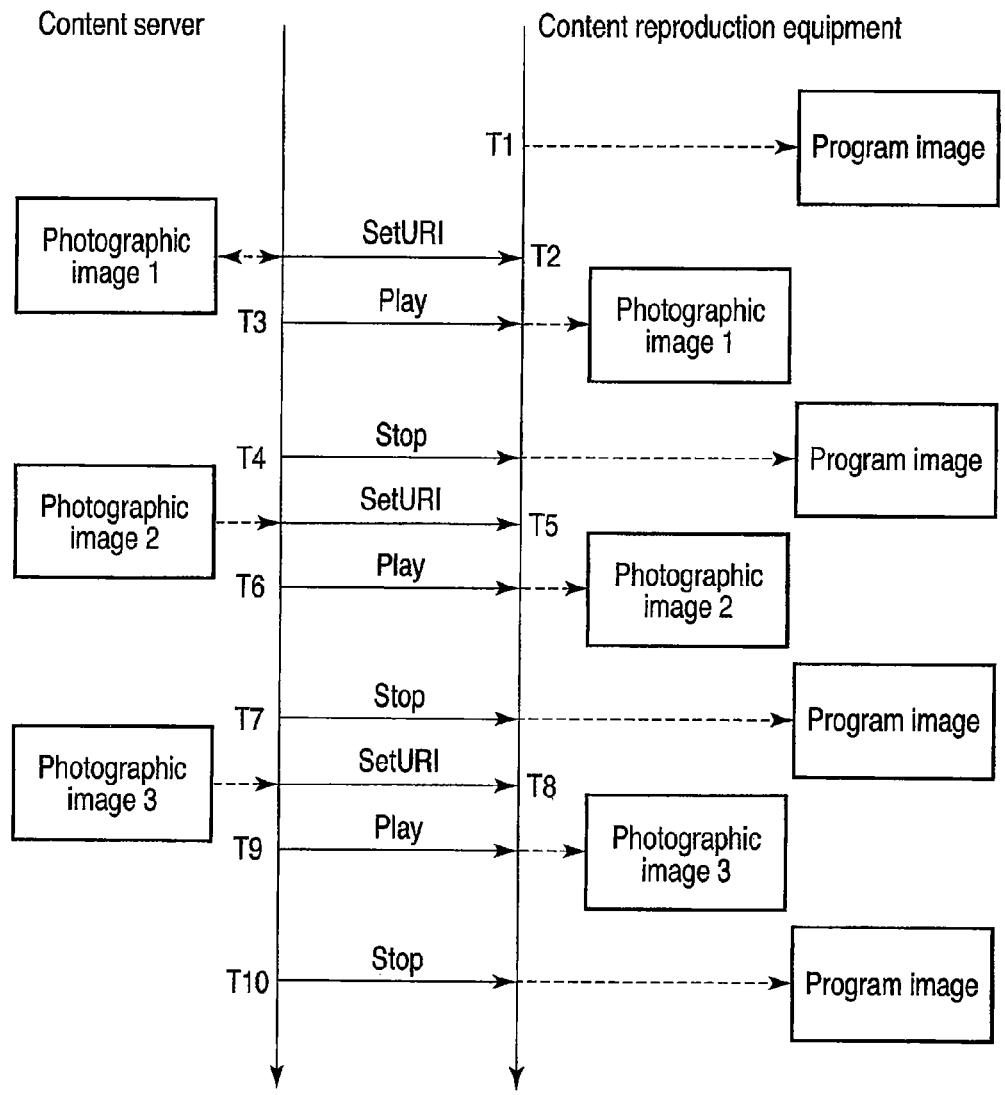
F I G. 4

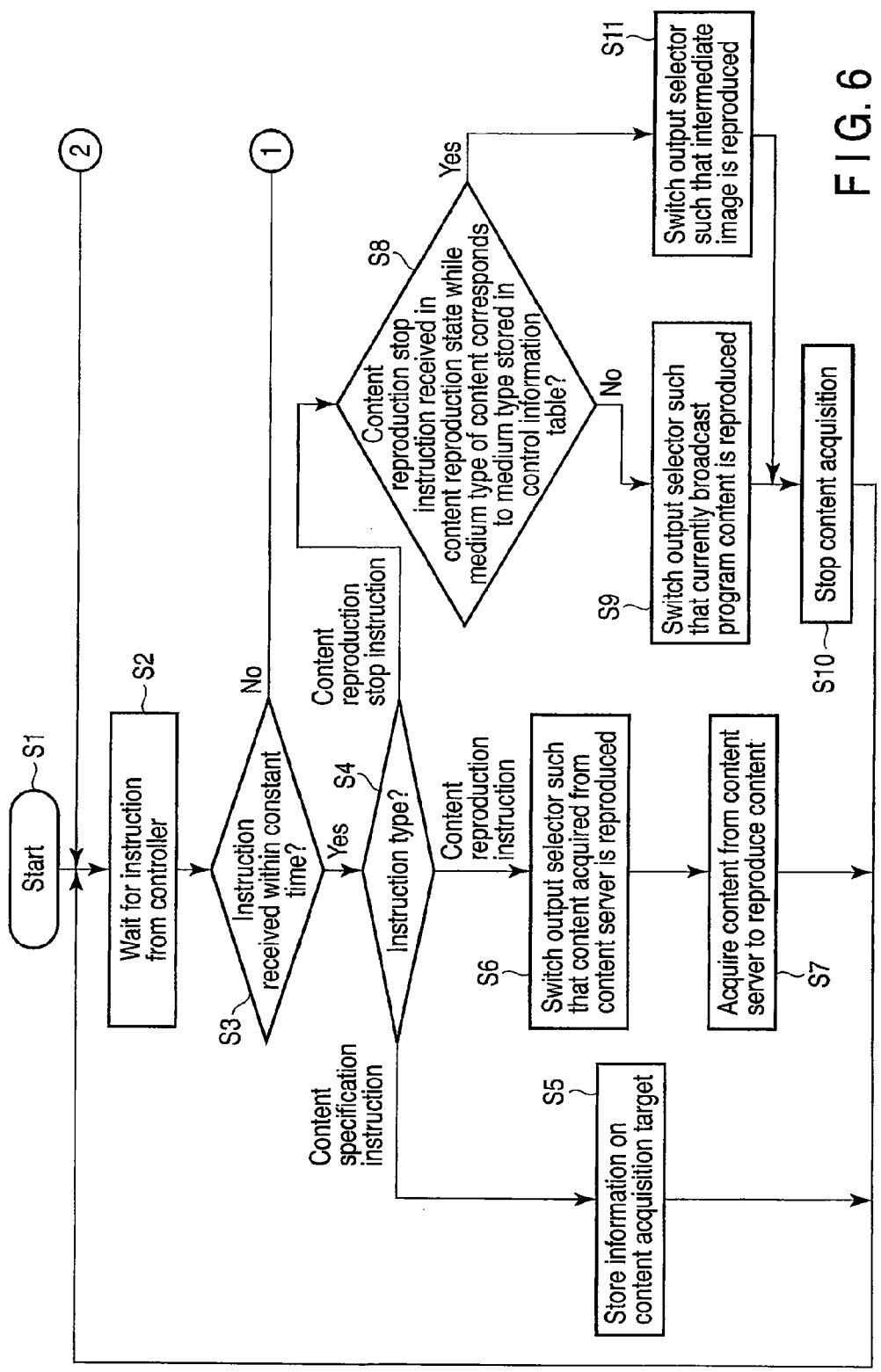
F I G. 6

REPRODUCTION APPARATUS AND REPRODUCTION METHOD

CROSS-REFERENCE TO RELATED APPLICATIONS

This application is based upon and claims the benefit of priority from Japanese Patent Application No. 2009-239507, filed Oct. 16, 2009, the entire contents of which are incorporated herein by reference.

BACKGROUND

1. Field

One embodiment of the invention relates to a reproduction apparatus and a reproduction method, which are suitably used in equipment having a digital broadcast receiving function, and particularly to an improved function of acquiring content through a network to reproduce the content.

2. Description of the Related Art

As is well known, switchover to digital television broadcasting has recently been promoted. Not only digital direct broadcasting by satellite (DBS) but also terrestrial digital broadcasting have been implemented in Japan.

Therefore, a digital broadcast receiver that receives digital television broadcasting is equipped with a function of selectively receiving satellite digital broadcasting and terrestrial digital broadcasting in addition to the existing terrestrial analog broadcasting. Currently this kind of digital broadcast receiver is also equipped with a network connection function.

The digital broadcast receiver is connected to a network by the network connection function along with a personal computer (PC) that constitutes a controller and a content server that can provide much content. Therefore, a content reproduction system that acquires content specified by the PC from the content server to reproduce the content can be constructed.

The digital broadcast receiver that can construct this kind of content reproduction system is generally configured to follow a digital media renderer (DMR) function pursuant to Digital Living Network Alliance (DLNA) based on Universal Plug-and-Play (UPnP) Audiovisual (AV) version 1.

In this case, the digital broadcast receiver receives an instruction from the PC to make a transition to two types of states, that is, a reproduction state in which content acquired from the content server is reproduced and a stop state in which the content reproduction is stopped. In the stop state, the digital broadcast receiver functions such that a program image currently broadcast in a channel received thereby is displayed on a screen.

It is assumed that a user selects plural content items from many content items that can be provided by the content server using the PC to perform a slideshow in which the digital broadcast receiver automatically reproduces the selected plural content items in order with a constant period.

In this case, the PC repeatedly provides an instruction to specify content selected from the content server, an instruction to acquire and reproduce the selected content, and an instruction to stop the content reproduction to the digital broadcast receiver.

As described above, when in the stop state, the digital broadcast receiver displays the program image currently broadcast in the channel received thereby on the screen. The digital broadcast receiver cannot distinguish whether the PC performs the slideshow or the content items are reproduced singly.

Therefore, the digital broadcast receiver displays the program image currently broadcast in the channel received thereby on the screen even while the slideshow is performed, when making the transition to the stop state in response to the stop instruction. Then the digital broadcast receiver displays reproduced image of the next content item acquired from the content server on the screen when receiving the next reproduction instruction.

That is, in the current content reproduction system, the currently broadcast program image is displayed on the screen even while the slideshow is performed when the digital broadcast receiver becomes the stop state. Therefore, the currently broadcast program image is displayed between the content images that are sequentially displayed on the screen by the slideshow.

For example, in a configuration disclosed in Jpn. Pat. Appln. KOKAI Publication No. 2007-006443, when a display reproduction module that is connected to the network to be manipulated by a manipulation controller receives a tentatively stop instruction while reproducing content, a screen at that time is cut out from the content as a thumbnail image, which is then displayed on a manipulation panel of the manipulation controller.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 illustrates an example of an operation when the content reproduction equipment of the embodiment performs a slideshow;

FIG. 4 illustrates an example of an operation when the content reproduction equipment of the embodiment performs a slideshow without displaying an intermediate image;

FIG. 6 is an exemplary flowchart illustrating part of a main processing operation of the content reproduction equipment of the embodiment;

DETAILED DESCRIPTION

Various embodiments according to the invention will be described hereinafter with reference to the accompanying drawings. In general, according to one embodiment of the invention, when receiving a reproduction instruction, a reproduction apparatus performs image display based on second image information acquired through a network. When the reproduction apparatus receives a stop instruction while performing the image display based on the second image information, the reproduction apparatus performs the image display based on received first image information after performing the image display for a predetermined time based on third image information.

Figure 1:
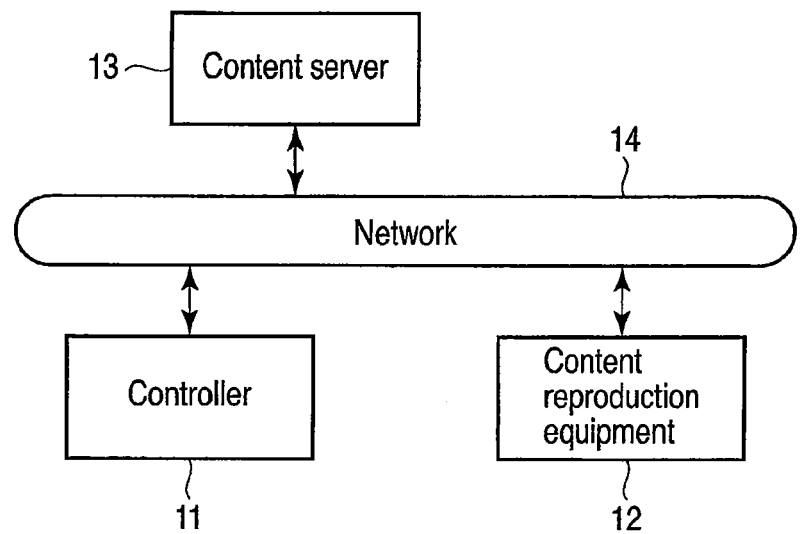
FIG. 1 is an exemplary block diagram illustrating an outline of a content reproduction system according to an embodiment of the invention.

FIG. 1 illustrates an outline of a content reproduction system of the embodiment. In a configuration of the content reproduction system, a controller 11 comprising, for example, a PC, content reproduction equipment 12 having a digital broadcast receiving function, and a content server 13 that can selectively provide much content are connected through a network 14 such that information can be transmitted.

A user manipulates the controller 11 to acquire information on many content items stored in the content server 13, and selects content to be reproduced. Then the user manipulates the controller 11 to supply a content specification instruction for specifying the selected content and a content reproduction instruction for reproducing the specified content to the content reproduction equipment 12.

The content reproduction equipment 12 acquires the content specified by the content specification instruction from the content server 13 and reproduces the content based on the content reproduction instruction. As used herein, the content reproduction performed by the content reproduction equipment 12 means that image information and sound information are restored from the acquired content and used in the screen display or sound reproduction.

Then, when the user manipulates the controller 11 to output a content reproduction stop instruction for stopping the content reproduction to the content reproduction equipment 12, the content reproduction equipment 12 stops the content reproduction. In this case, although described in detail later, when stopping the content reproduction, the content reproduction equipment 12 uses a previously prepared intermediate image in the screen display only for a previously set predetermined time (for example, 2 to 3 seconds), and then uses a program image currently broadcast in a channel received thereby in the screen display.

Figure 2:
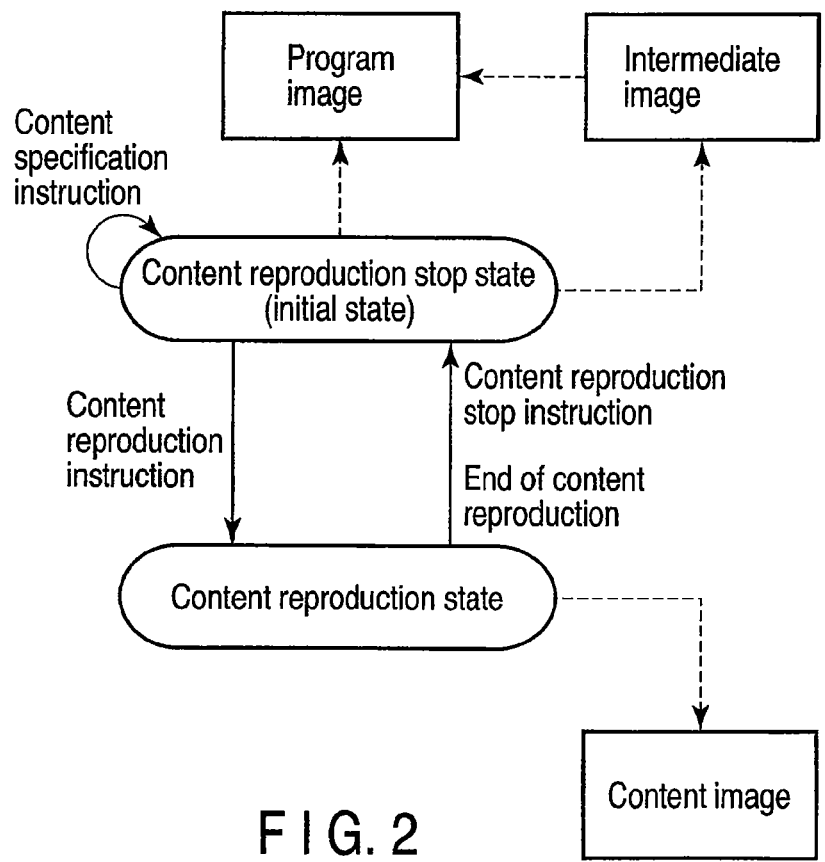
FIG. 2 illustrates an example of a state transition of content reproduction equipment constituting the content reproduction system of the embodiment.

FIG. 2 illustrates transition states of options that are available to the content reproduction equipment 12 by the instructions from the controller 11. In the content reproduction equipment 12, the content reproduction stop state in which the content acquired from the content server 13 is not reproduced is set as an initial state. In the content reproduction stop state, the content reproduction equipment 12 uses the program image currently broadcast in the channel received thereby in the screen display.

In the content reproduction stop state, the content reproduction equipment 12 receives the content specification instruction and the content reproduction instruction from the controller 11. When receiving the content specification instruction, the content reproduction equipment 12 acquires the specified content from the content server 13 while remaining in the content reproduction stop state.

On the other hand, when receiving content reproduction instruction, the content reproduction equipment 12 makes a transition to the content reproduction state in which the content acquired from the content server 13 is reproduced. In the content reproduction state, the content reproduction equipment 12 uses the content image acquired from the content server 13 in the screen display.

The content reproduction equipment 12 makes a transition to the content reproduction stop state, when receiving the content reproduction stop instruction for stopping the content reproduction in the content reproduction state, or when the content reproduction is ended. When making the transition from the content reproduction state to the content reproduction stop state in response to the content reproduction stop instruction, the content reproduction equipment 12 uses the previously prepared intermediate image only for the previously set predetermined time, and then uses the program image currently broadcast in the channel received thereby in the screen display.

That is, when making the transition from the content reproduction state to the content reproduction stop state in response to the content reproduction stop instruction, the display screen is switched from the content image to the intermediate image, and the screen display of the currently received program image is performed when the previously set predetermined time elapses. In this case, image information such as a black screen which is set irrespective of the content image is used as the intermediate image.

When the transition from the content reproduction state to the content reproduction stop state is made due to the end of the content reproduction, the intermediate image is not used in the screen display, but the currently broadcast program image is used in the screen display.

It is assumed that the user selects plural content items from many content items that can be provided by the content server 13 using the controller 11 to perform a slideshow in which the content reproduction equipment 12 automatically reproduces the selected plural content items in order with a constant period.

At this point, the controller 11 repeatedly supplies the content specification instruction, the content reproduction instruction, and the content reproduction stop instruction to the content reproduction equipment 12 at previously set time intervals. As described above, when making the transition from the content reproduction state to the content reproduction stop state, the content reproduction equipment 12 performs the screen display of the intermediate image for the predetermined time after the content image, and performs the screen display of the currently received program image.

Therefore, when the predetermined time during which the screen display of the intermediate image is performed is estimated longer than the time until the transition to the content reproduction state is made again by the slideshow since the transition from the content reproduction state to the content reproduction stop state is made, the intermediate image is displayed between content images that are sequentially displayed on the screen by the slideshow, and the currently broadcast program image is not displayed.

As described above, the intermediate image is the image information used to display the black screen, and the currently broadcast program image mainly comprises the moving image. When the black screen is displayed between the content images that are sequentially displayed on the screen by the slideshow, user's viewability is improved much better than that of the display of the moving image.

Thus, when the content reproduction state is switched to the content reproduction stop state by the content reproduction stop instruction, the currently broadcast program image that becomes the image unnecessary for the user is prevented from being displayed, which allows the user's viewability of the slideshow to become better. Particularly, when the screen display of the photographic image is performed by the slideshow, the display of the currently broadcast program image is effectively eliminated in midstream.

The program image currently broadcast in the channel received thereby corresponds to the first image information described above. The content image specified by the controller 11 and acquired from the content server 13 corresponds to the second image information described above. The intermediate image corresponds to the third image information described above.

FIG. 3 illustrates an operation example when the content reproduction equipment 12 performs a slideshow of photographic images. In the operation example of FIG. 3, the content reproduction equipment 12 sequentially uses three photographic images 1, 2, and 3 in the screen display of the slideshow. In this case, content constituting the photographic images 1, 2, and 3 is stored in the content server 13.

At first, in the content reproduction stop state (initial state) at a time T1, the content reproduction equipment 12 uses the program image currently broadcast in the channel received thereby in the screen display. At a time T2, when receiving a content specification instruction (SetURI) from the controller 11, the content reproduction equipment 12 acquires content (photographic image 1) specified by the content specification instruction from the content server 13. At a time T3, the content reproduction equipment 12 uses the acquired content (photographic image 1) in the screen display based on a content reproduction instruction (Play) acquired from the controller 11.

Then, at a time T4, when receiving a content reproduction stop instruction (Stop) from the controller 11, the content reproduction equipment 12 uses the previously prepared intermediate image (black screen) in the screen display. At a time T5, when receiving a content specification instruction (SetURI) from the controller 11, the content reproduction equipment 12 acquires content (photographic image 2) specified by the content specification instruction from the content server 13. At a time T6, the content reproduction equipment 12 uses the acquired content (photographic image 2) in the screen display based on the content reproduction instruction (Play) acquired from the controller 11.

At a time T7, when receiving the content reproduction stop instruction (Stop) from the controller 11, the content reproduction equipment 12 uses the previously prepared intermediate image (black screen) in the screen display. At a time T8, when receiving the content specification instruction (SetURI) from the controller 11, the content reproduction equipment 12 acquires content (photographic image 3) specified by the content specification instruction from the content server 13. At a time T9, the content reproduction equipment 12 uses the acquired content (photographic image 3) in the screen display based on the content reproduction instruction (Play) acquired from the controller 11.

Then, at a time T10, when receiving the content reproduction stop instruction (Stop) from the controller 11, the content reproduction equipment 12 uses the previously prepared intermediate image (black screen) in the screen display. At a time T11 the display time of the intermediate image elapses, the content reproduction equipment 12 uses the program image currently broadcast in the channel received thereby in the screen display.

In the operation example of the content reproduction equipment 12 of FIG. 3, the black screen is displayed as the intermediate image among the photographic images 1, 2, and 3 that are sequentially displayed on the screen by the slideshow, so that the user's viewability of the slideshow can be improved much better than that of the display of the moving image that is the currently broadcast program image.

FIG. 4 illustrates an operation example when the content reproduction equipment 12 performs screen display of currently broadcast program image without performing the screen display of intermediate image when switched from the content reproduction state to the content reproduction stop state by the content reproduction stop instruction. In FIG. 4, the same process as that of FIG. 3 is designated by the same numeral. At the times T4, T7, and T10, when receiving the content reproduction stop instruction (Stop) from the controller 11, the content reproduction equipment 12 performs the screen display of the program image currently broadcast in the channel received thereby. Therefore, it is found that the user's viewability is degraded because the moving image that is the currently broadcast program image is displayed among the photographic images 1, 2, and 3 sequentially displayed on the screen by the slideshow.

Figure 5:
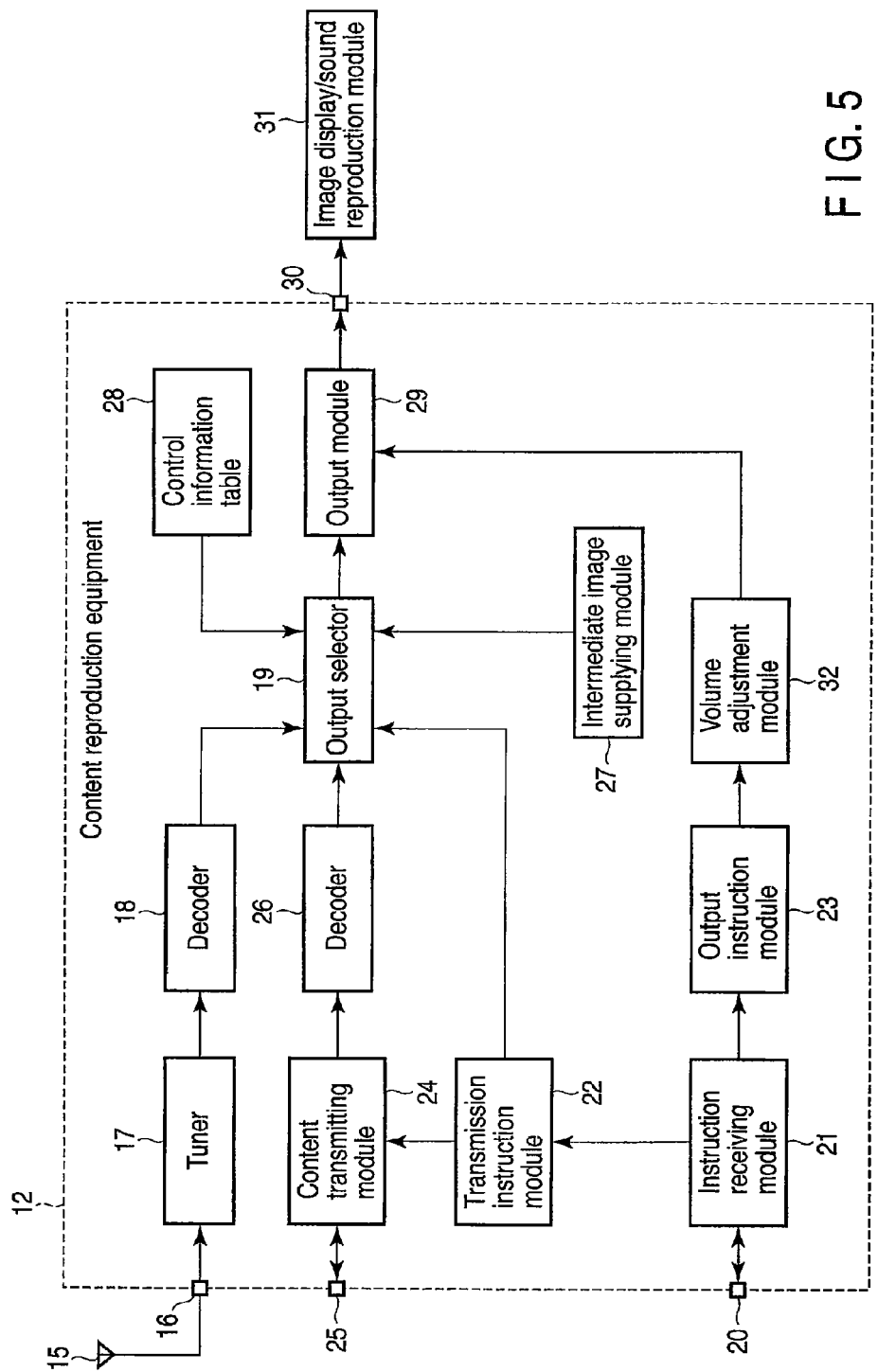
FIG. 5 is a block diagram illustrating an example of a signal processing system in the content reproduction equipment of the embodiment.

FIG. 5 illustrates an example of a signal processing system of the content reproduction equipment 12, which performs the screen display of the currently broadcast program image after the screen display of the intermediate image is performed for a predetermined time when the content reproduction state is switched to the content reproduction stop state by the content reproduction stop instruction. The content reproduction equipment 12 has a digital broadcast receiving function.

A digital broadcasting signal received by an antenna 15 is supplied to a tuner 17 through an input terminal 16, thereby tuning the broadcasting signal of the desired channel. A decoder 18 restores the broadcasting signal tuned by the tuner 17 to the image information and sound information constituting program content, and the image information and the sound information are supplied to an output selector 19.

The content reproduction equipment 12 comprises a connection terminal 20. The connection terminal 20 receives various pieces of instruction information such as the content specification instruction, the content reproduction instruction, the content reproduction stop instruction, and a volume adjustment instruction, which are output from the controller 11, through the network 14. The various pieces of instruction information received by the connection terminal 20 are input into an instruction receiver 21.

The instruction receiver 21 makes a reply of the reception of the instruction information to the controller 11 through the connection terminal 20 and the network 14, supplies various pieces of instruction information indicating the content specification instruction, content reproduction instruction, and content reproduction stop instruction in the input various pieces of instruction information to a transmission instruction module 22, and supplies information indicating the volume adjustment instruction to an output instruction module 23.

The transmission instruction module 22 controls a content transmitting module 24 based on various pieces of instruction information indicating the content specification instruction, the content reproduction instruction, and the content reproduction stop instruction, which are supplied from the instruction receiver 21. That is, when the content specification instruction is input, the transmission instruction module 22 stores information indicating an acquisition target of the specified content. The content specification instruction information includes the information indicating the acquisition target of the specified content.

When the content reproduction instruction is input, the transmission instruction module 22 supplies the information indicating the acquisition target of the content to the content transmitting module 24. Therefore, the content transmitting module 24 makes a request to acquire the content through a connection terminal 25 and the network 14 to the content server 13 that becomes the acquisition target of the content, and the content transmitting module 24 acquires the requested content from the content server 13 through the network 14 and the connection terminal 25.

When the content reproduction stop instruction is input, the transmission instruction module 22 supplies the instruction information to the content transmitting module 24. Therefore, the content transmitting module 24 stops the acquisition of the content from the content server 13 based on the input content reproduction stop instruction.

A decoder 26 restores the content, acquired by the content transmitting module 24 based on the content reproduction instruction, to the image information and the sound information. Then the image information and the sound information are supplied to the output selector 19.

An intermediate image supplying module 27 and a control information table 28 are connected to the output selector 19. The intermediate image supplying module 27 stores intermediate image information therein in order to perform the screen display of the previously prepared intermediate image, and outputs the intermediate image information to the output selector 19. Information indicating the previously set predetermined time during which the screen display of the intermediate image is performed and information indicating for what type of content the screen display of the intermediate image is performed when switched from the reproduction state to the reproduction stop state, that is, a content medium type (photograph in FIG. 3) are stored in the control information table 28, and these pieces of information are output to the output selector 19.

At this point, the transmission instruction module 22 instructs the output selector 19 to select the pieces of information output from the decoders 18 and 26 and the intermediate image supplying module 27. The output selector 19 refers to the pieces of information stored in the control information table 28 to control the selection instruction provided from the transmission instruction module 22. The information selected by the output selector 19 is supplied to the output module 29.

Specifically, when the content reproduction equipment 12 is in the stable content reproduction stop state, the transmission instruction module 22 instructs the output selector 19 to supply the image information and sound information output from the decoder 18 to an output module 29. The output module 29 performs predetermined signal processing to the input image information and sound information in order to use the image information and sound information in the screen display or sound reproduction. The image information and sound information, to which the signal processing has been performed by the output module 29, are supplied to an external image display/sound reproduction module 31 through an output terminal 30 in order to use the image information and sound information in the screen display or sound reproduction. Therefore, the program content currently broadcast in the received channel is reproduced in the stable content reproduction stop state.

When the content reproduction equipment 12 is in the content reproduction state, the transmission instruction module 22 instructs the output selector 19 to supply the image information and sound information output from the decoder 26 to the output module 29. Therefore, the content acquired from the content server 13 is reproduced in the content reproduction state.

When the content reproduction equipment 12 makes the transition to the content reproduction stop state in response to the content reproduction stop instruction from the content reproduction state, the transmission instruction module 22 instructs the output selector 19 to supply the intermediate image information output from the intermediate image supplying module 27 to the output module 29, thereby performing the screen display of the intermediate image.

In this case, the output selector 19 determines whether the medium type of content reproduced in the content reproduction state before the content reproduction stop instruction is received corresponds to the medium type (photograph in FIG. 3) indicated by the information stored in the control information table 28. When the medium type of content reproduced in the content reproduction state before the content reproduction stop instruction is received corresponds to the medium type (photograph in FIG. 3) indicated by the information stored in the control information table 28, the output selector 19 supplies the intermediate image information to the output module 29 only for the time indicated by the time information stored in the control information table 28.

When the medium type of content reproduced in the content reproduction state before the content reproduction stop instruction is received does not correspond to the medium type (photograph in FIG. 3) indicated by the information stored in the control information table 28, the output selector 19 supplies the image information and sound information output from the decoder 18 to the output module 29, that is, is operated such that the currently broadcast program content is reproduced.

When the time indicated by the time information stored in the control information table 28 elapses since the intermediate image information is supplied to the output module 29, the output selector 19 automatically supplies the image information and sound information output from the decoder 18 to the output module 29, that is, is operated such that the currently broadcast program content is reproduced.

When the output selector 19 receives the instruction from the transmission instruction module 22 to supply the image information and sound information output from the decoder 26 to the output module 29 while supplying the intermediate image information to the output module 29, the output selector 19 performs the instruction. Therefore, even if the screen display of the intermediate image is performed, the screen display of the content image can be immediately performed when the content reproduction instruction is received from the controller 11. That is, the screen display of the next content image can be performed without performing the screen display of the intermediate image until the time indicated by the time information stored in the control information table 28 elapses.

When the content reproduction equipment 12 makes the transition from the content reproduction state to the content reproduction stop state by the end of the content reproduction, the transmission instruction module 22 instructs the output selector 19 to supply the image information and sound information output from the decoder 18 to the output module 29, that is, is operated such that the currently broadcast program content is reproduced. Therefore, when the content reproduction is ended, the currently broadcast program content is reproduced without performing the screen display of the intermediate image.

The output instruction module 23 receives information indicating the volume adjustment instruction supplied from the instruction receiver 21 and supplies the information to a volume adjustment module 32. The volume adjustment module 32 adjusts the volume of the sound information to the output module 29 based on the information indicating the input volume adjustment instruction. Therefore, the sound reproduced by the image display/sound reproduction module 31 is adjusted to the volume instructed by the controller 11.

Figure 7:
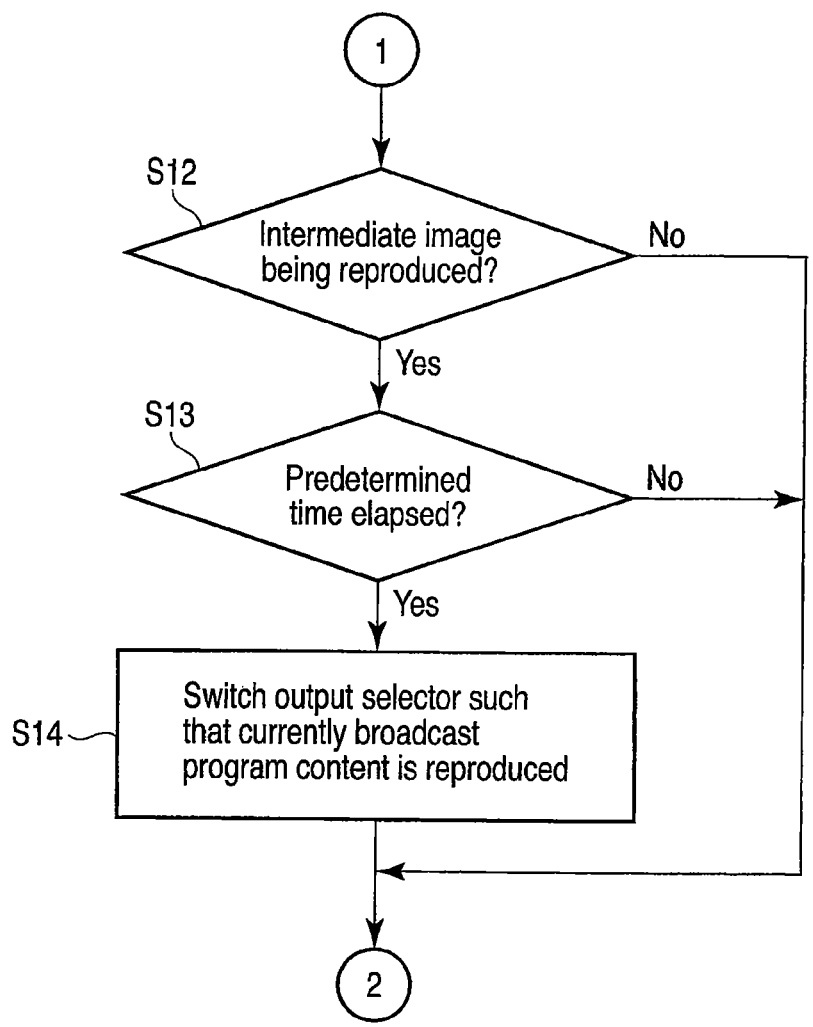
FIG. 7 is an exemplary flowchart illustrating the rest of the main processing operation of the content reproduction equipment of the embodiment.

FIGS. 6 and 7 are flowcharts in which main processing operations of the content reproduction equipment 12 are summarized. When the processing is started (Step S1), the instruction receiver 21 becomes a standby state to wait for the instruction from the controller 11 in Step S2, and determines whether the instruction from the controller 11 is received within the previously set constant time in Step S3.

When the instruction from the controller 11 is received within the previously set constant time (YES in Step S3), the instruction receiver 21 determines the type of instruction from the controller 11 in Step S4. When the instruction receiver 21 determines that the instruction from the controller 11 is the content specification instruction, the transmission instruction module 22 stores information that becomes the acquisition target of the specified content (for example, information indicating the uniform resource locator [URL] of content and a reproduction starting position) in Step S5. The information is included in the content specification instruction information. Then the flow returns to the processing in Step S2.

When the instruction receiver 21 determines that the instruction from the controller 11 is the content reproduction instruction in Step S4, the transmission instruction module 22 instructs the output selector 19 to select the output of the decoder 26 in Step S6. In Step S7, the transmission instruction module 22 transmits the information indicating the content acquisition target, stored in Step S5, to the content transmitting module 24 to make a request to acquire the content to the content server 13 that becomes the content acquisition target, and the transmission instruction module 22 reproduces the content acquired from the content server 13 based on the request. Then the flow returns to the processing in Step S2.

When the instruction receiver 21 determines that the instruction from the controller 11 is the content reproduction stop instruction in Step S4, the transmission instruction module 22 determines whether conditions that the content reproduction stop instruction is received in the content reproduction state while the medium type of the content reproduced in the content reproduction state corresponds to the medium type stored in the control information table 28 (in this case, the content is the photograph) are satisfied in Step S8.

When the conditions are not satisfied (NO in Step S8), the transmission instruction module 22 instructs the output selector 19 to select the output of the decoder 18 in Step S9. In Step S10, the transmission instruction module 22 provides the content reproduction stop instruction to the content transmitting module 24, thereby stopping the content acquisition from the content server 13. Then the flow returns to the processing in Step S2.

When the conditions are satisfied (YES in Step S8), the transmission instruction module 22 instructs the output selector 19 to select the intermediate image information supplied from the intermediate image supplying module 27 in Step S11. In Step S10, the transmission instruction module 22 provides the content reproduction stop instruction to the content transmitting module 24, thereby stopping the content acquisition from the content server 13. Then the flow returns to the processing in Step S2.

On the other hand, when the instruction from the controller 11 is not received within the previously set constant time (NO in Step S3), the output selector 19 determines whether the currently selected information is the intermediate image information in Step S12. When the currently selected information is not the intermediate image information (NO in Step S12), the flow returns to the processing in Step S2.

When the currently selected information is the intermediate image information (YES in Step S12), the output selector 19 determines whether the predetermined time stored in the control information table 28 elapses since the intermediate image information is selected, that is, the screen display of the intermediate image is performed for the predetermined time in Step S13. When the predetermined time does not elapse (NO in Step S13), the flow returns to the processing in Step S2.

When the predetermined time elapses (YES in Step S13), the output selector 19 supplies the image information and sound information output from the decoder 18 to the output module 29, that is, is switched such that the currently broadcast program content is reproduced in Step S14. Then, the flow returns to the processing in Step S2.

In the embodiment, the black screen is displayed as the intermediate image when the transition from the content reproduction state to the content reproduction stop state is made by the content reproduction stop instruction. However, obviously the intermediate image is not limited to the black screen.

Figure 8:
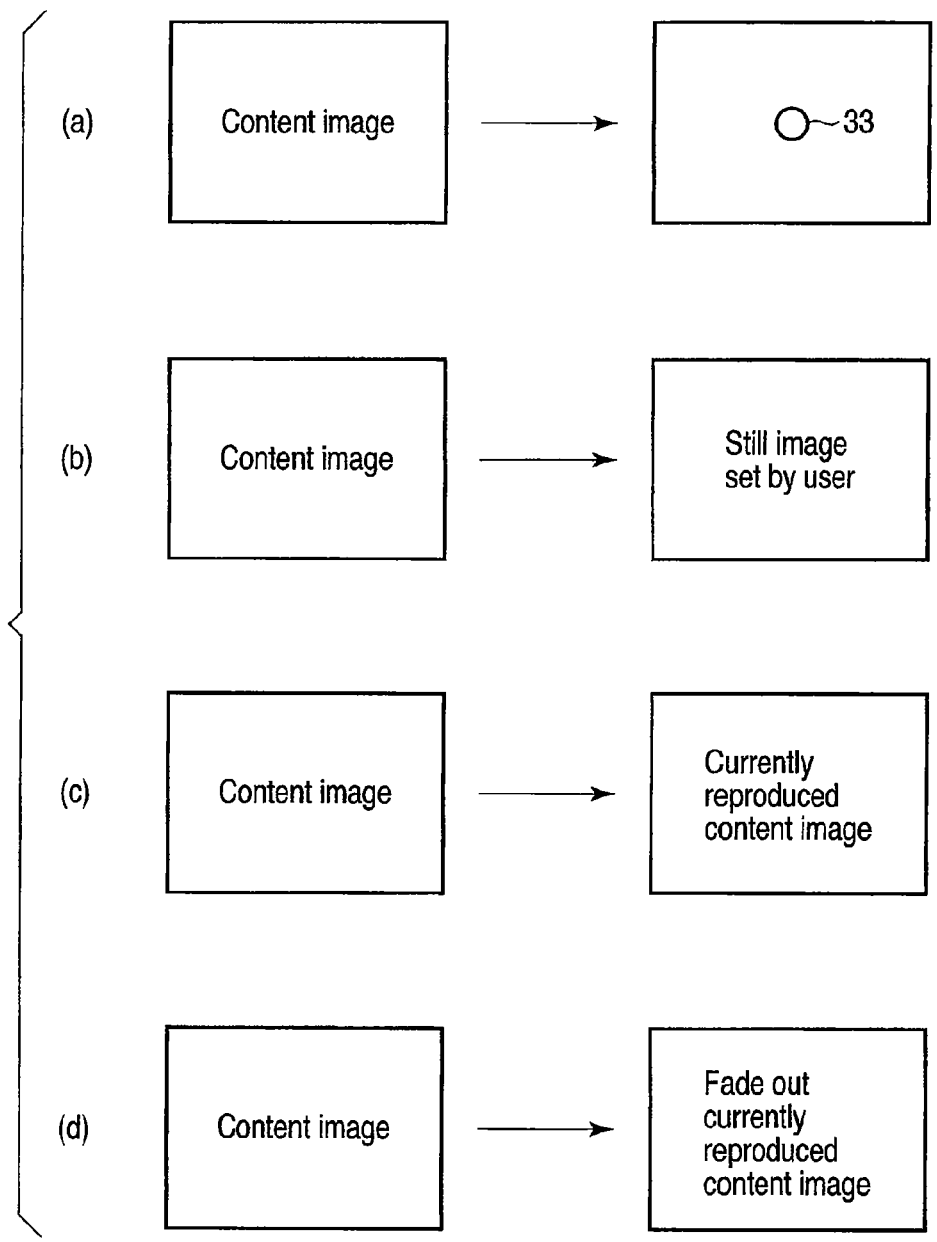
FIG. 8 illustrates various examples of the intermediate image displayed by the content reproduction equipment of the embodiment.

As illustrated in (a) of FIG. 8, the screen display of an icon 33 ("O" in FIG. 8) may be performed as the intermediate image when the transition from the content reproduction state to the content reproduction stop state is made by the content reproduction stop instruction.

As illustrated in (b) of FIG. 8, the screen display of a still image previously set by the user may be performed as the intermediate image when the transition from the content reproduction state to the content reproduction stop state is made by the content reproduction stop instruction.

As illustrated in (c) of FIG. 8, when the transition from the content reproduction state to the content reproduction stop state is made by the content reproduction stop instruction, the screen display of the content image that is reproduced in the content reproduction state before the transition to the content reproduction stop state is made may be performed as the intermediate image.

As illustrated in (d) of FIG. 8, when the transition from the content reproduction state to the content reproduction stop state is made by the content reproduction stop instruction, the screen display of the content image that is reproduced in the content reproduction state before the transition to the content reproduction stop state is made may be performed as the intermediate image such that the content image fades out.

In the embodiment, the photographic image has been described as the content reproduced in the slideshow by way of example. However, obviously the content is not limited to the photographic image. For example, the content reproduced in the slideshow may be the still image, the moving image, the sound, and the music other than the photographic image.

In the case where the screen display of the moving image is performed as the content, when the transition from the content reproduction state to the content reproduction stop state is made by the content reproduction stop instruction, the screen display of the image immediately before the transition to the content reproduction stop state may be performed as the intermediate image, or the screen display of the image immediately before the transition to the content reproduction stop state may be performed such that the image fades out.

In the embodiment, when the transition from the content reproduction state to the content reproduction stop state is made by the content reproduction stop instruction, the information indicating the medium type (in this case, photograph) of content whose screen display is performed as the intermediate image is stored in the control information table 28. Therefore, the screen display of the intermediate image is performed between the photographic images when the photographic image is reproduced by the slideshow, and the currently broadcast program content is reproduced between content items when the content (such as the moving image and the music) other than the photograph is reproduced by the slideshow.

In the embodiment, the intermediate image is displayed when the content medium type is the photograph. However, obviously the invention is not limited to the embodiment. For example, the processing similar to that of the embodiment may be performed to reproduction of a play list of the moving image (video) or music. In such cases, because the controller 11 receives a notification of reproduction end from the content reproduction equipment 12 to provide an instruction to reproduce the next SetURI, the content reproduction equipment 12 may display the intermediate image according to a time interval during which the instruction to reproduce the SetURI is received.

When the transition from the content reproduction state to the content reproduction stop state is made by the content reproduction stop instruction, the predetermined time during which the screen display of the intermediate image is performed may be changed according to the medium type of content reproduced by the slideshow or content of the intermediate image.

The time until the controller 11 provides the content reproduction instruction since the controller 11 provides the content reproduction stop instruction is measured, and the minimum value of the measured time is stored as the predetermined time during which the screen display of the intermediate image is performed in the control information table 28, allowing the setting of the screen display of the intermediate image.

When the plural controllers 11 exist, the time until each of the controllers 11 provides the content reproduction instruction since the controller 11 provides the content reproduction stop instruction is measured, and the minimum value of the measured time is stored as the predetermined time during which the screen display of the intermediate image is performed in the control information table 28, which allows the display time of the intermediate image to be dynamically dealt with according to the controller 11.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A reproduction apparatus comprising:
   a first receiver configured to receive first image information;
   a second receiver configured to receive second image information, first control information providing an instruction to reproduce the second image information, and second control information providing an instruction to stop the reproduction of the second image information, the first control information and the second control information being provided at predetermined regular intervals; and
   an output selector configured to select the second image information for display when the first control information is received and to select third image information for display for a predetermined time period before selecting the first image information for display when the second control information is received while the second image information is displayed;
   wherein the output selector is further configured to select the second image information for display if the first control information is received before the third image information has been displayed for the predetermined time period after the second control information is received, and, if the first control information is not received before the third image information has been displayed for the predetermined time period, to select the first image information for display after the third image information has been displayed for the predetermined time period.

2. The reproduction apparatus of claim 1, wherein the output selector is configured to select one of a predetermined still image information and a moving image information as the third image information.

3. The reproduction apparatus of claim 1, wherein the output selector is configured to select the second image information as the third image information, the second image information being displayed before the second control information is received.

4. The reproduction apparatus of claim 1, wherein the output selector is configured to select the first image information for display after the third image information is displayed upon receiving the second control information when the second image information corresponds to a pre-defined type, and
   the output selector is configured to select the first image information upon receiving the second control information when the second image information does not correspond to the pre-defined type.

5. The reproduction apparatus of claim 1, wherein the output selector is configured to change the predetermined time period according to a type of the second image information selected for display.

6. The reproduction apparatus of claim 1, wherein the output selector is configured to measure a shortest time until the first control information is received since the second control information is received, and set a time during which the image display is performed based on the third image information according to the shortest time.

7. The reproduction apparatus of claim 1, wherein the first image information is image information of a broadcast program.

8. The reproduction apparatus of claim 1, wherein a time interval between a first time when the second control information is transmitted until a second time when the first control information is transmitted is a second predetermined time period, and the predetermined time period is longer than the second predetermined time period.

9. The reproduction apparatus of claim 1, wherein the first control information includes a universal resource locator (URL) for the second image information.

10. The reproduction apparatus of claim 1, wherein the second image information, first control information, and second control information are transmitted through a network.

11. The reproduction apparatus of claim 1, wherein the second image information is supplied by a content server.

12. The reproduction apparatus of claim 1, wherein the first control information and the second control information are repeatedly transmitted at predetermined intervals.

13. The reproduction apparatus of claim 1, wherein the second image information is information associated with a still image.

14. A reproduction method comprising:
receiving first image information;
receiving second image information;
selecting the second image information for display when a reproduction instruction is received
    selecting third image information for display when a stop instruction is received;
    displaying an image based on the third image information for a predetermined time period, unless the reproduction instruction is received before the predetermined time period has lapsed; and
    selecting the first image information for display after the third image information has been displayed for the predetermined time period.

15. The reproduction method of claim 14, wherein the first image information is image information of a broadcast program.

16. The reproduction apparatus of claim 14, wherein the reproduction instruction includes a universal resource locator (URL) for the second image information.

17. The reproduction apparatus of claim 14, wherein the reproduction instruction and the stop instruction are repeatedly transmitted at predetermined intervals.

18. A reproduction apparatus comprising:
a receiver configured to receive first image information;
a first controller configured to: repeatedly receive a specification instruction, reproduction instruction, and a reproduction stop instruction through a network at predetermined regular intervals; acquire second image information specified by the specification instruction through the network, upon reception of the specification instruction; cause an image display operation to be performed based on the second image information, upon reception of the reproduction instruction; and stop the image display operation based on the second image information, upon reception of the reproduction stop instruction; and
a second controller configured to cause the image display operation to be performed based on the first image information received by the receiver after causing the image display operation to be performed based on third image information, if the first controller stops the image display operation based on the second image information upon reception of the reproduction stop instruction.

19. The reproduction apparatus of claim 18, wherein the second controller is further configured to cause, if the first controller stops the image display operation based on the second image information upon reception of the reproduction stop instruction, the image display operation to be performed based on the third image information before causing the image display operation to be performed based on the first image information received by the receiver.

20. The reproduction apparatus of claim 18, wherein the third image information is information for causing a black image to be displayed.

21. The reproduction apparatus of claim 18, wherein the second image information is information associated with a still image.

22. A reproduction method comprising:
receiving first image information:
repeatedly receiving a specification instruction, a reproduction instruction and a reproduction stop instruction through a network at predetermined regular intervals;
acquiring the second information specified by the specification instruction through the network, upon reception of the specification instruction;
causing an image display operation to be performed based on the second image information, upon reception of the reproduction instruction;
stopping the image display operation based on the second image information, upon reception of the reproduction stop instruction; and
causing the image display operation to be performed based on the first image information after causing the image display operation to be performed on third image information, if the image display operation based on the second image information is stopped upon reception of the reproduction stop instruction.

23. The reproduction method of claim 22, wherein if the image display operation based on the second image information is stopped upon reception of the reproduction stop instruction, the image display operation is caused to be performed based on the third image information before causing the image display operation to be performed based on the first image information.

24. The reproduction method of claim 22, wherein the third image information is information for causing a black image to be displayed.

* * * * *